US011288294B2

(12) United States Patent
Wason et al.

(10) Patent No.: US 11,288,294 B2
(45) Date of Patent: Mar. 29, 2022

(54) NATURAL LANGUAGE PROCESSING AND ARTIFICIAL INTELLIGENCE BASED SEARCH SYSTEM

(71) Applicant: ACCENTURE GLOBAL SOLUTIONS LIMITED, Dublin (IE)

(72) Inventors: Prashant Wason, Bangalore (IN); Irfan Khan, Bangalore (IN); Rohan Rohan, Bangalore (IN); Saikat Jana, Bangalore (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 453 days.

(21) Appl. No.: 16/249,697

(22) Filed: Jan. 16, 2019

(65) Prior Publication Data
US 2019/0332620 A1  Oct. 31, 2019

(30) Foreign Application Priority Data
Apr. 26, 2018  (IN) .............................. 201811015862

(51) Int. Cl.
*G06F 16/33* (2019.01)
*G06F 16/31* (2019.01)
(Continued)

(52) U.S. Cl.
CPC ........ *G06F 16/3344* (2019.01); *G06F 16/313* (2019.01); *G06F 16/322* (2019.01);
(Continued)

(58) Field of Classification Search
CPC .. G06F 16/3344; G06F 40/295; G06F 16/313; G06F 16/35; G06F 16/322;
(Continued)

(56) References Cited

U.S. PATENT DOCUMENTS 8,442,940 B1 * 5/2013 Faletti .................. G06F 16/367
                                                  707/610
8,935,275 B2  1/2015 Rathod
(Continued)

FOREIGN PATENT DOCUMENTS

CN         106855853         6/2017

*Primary Examiner* — Pierre M Vital
*Assistant Examiner* — Zuheir A Mheir
(74) *Attorney, Agent, or Firm* — Mannava & Kang, P.C.

(57) ABSTRACT

In some examples, natural language processing (NLP) and artificial intelligence based searching may include identifying named entities in text from a corpus of documents. References in the text may be resolved with the identified named entities. Links between the named entities may be determined, and a bi-direction rootless graph may be generated. Semantic relationships may be determined from text of the named entities, and blacklist keywords may be identified. Machine learning classification may be performed based on a pair of the named entities and a blacklist keyword. A classification may be determined based on the pair of named entities and the blacklist keyword, and a rule may be identified that specifies which named entity in the pair is to be flagged. Further, a node in the graph may be flagged based on an association with the named entity identified according to the rule.

17 Claims, 15 Drawing Sheets

(51) Int. Cl.
*G06F 16/35* (2019.01)
*G06F 40/295* (2020.01)
*G06N 20/00* (2019.01)

(52) U.S. Cl.
CPC ............ *G06F 16/35* (2019.01); *G06F 40/295* (2020.01); *G06N 20/00* (2019.01)

(58) Field of Classification Search
CPC ...... G06F 16/9027; G06F 16/36; G06F 40/30; G06N 20/00; G06N 5/022; G06N 5/025
See application file for complete search history.

(56) References Cited

U.S. PATENT DOCUMENTS

| | | | |
|---|---|---|---|
| 9,710,544 B1* | 7/2017 | Smith | G06F 40/30 |
| 2006/0074980 A1* | 4/2006 | Sarkar | G06F 16/958 |
| 2013/0305356 A1* | 11/2013 | Cohen-Ganor | G06F 21/566 |
| | | | 726/22 |
| 2014/0250111 A1* | 9/2014 | Morton | G06F 16/951 |
| | | | 707/723 |
| 2014/0372351 A1* | 12/2014 | Sun | G06Q 10/063 |
| | | | 706/12 |
| 2016/0140447 A1 | 5/2016 | Cohen et al. | |
| 2017/0075904 A1* | 3/2017 | Hedges | G06F 16/367 |
| 2017/0091274 A1* | 3/2017 | Guo | G06F 16/215 |
| 2018/0082183 A1* | 3/2018 | Hertz | G06Q 10/10 |

* cited by examiner

RED FLAGGING
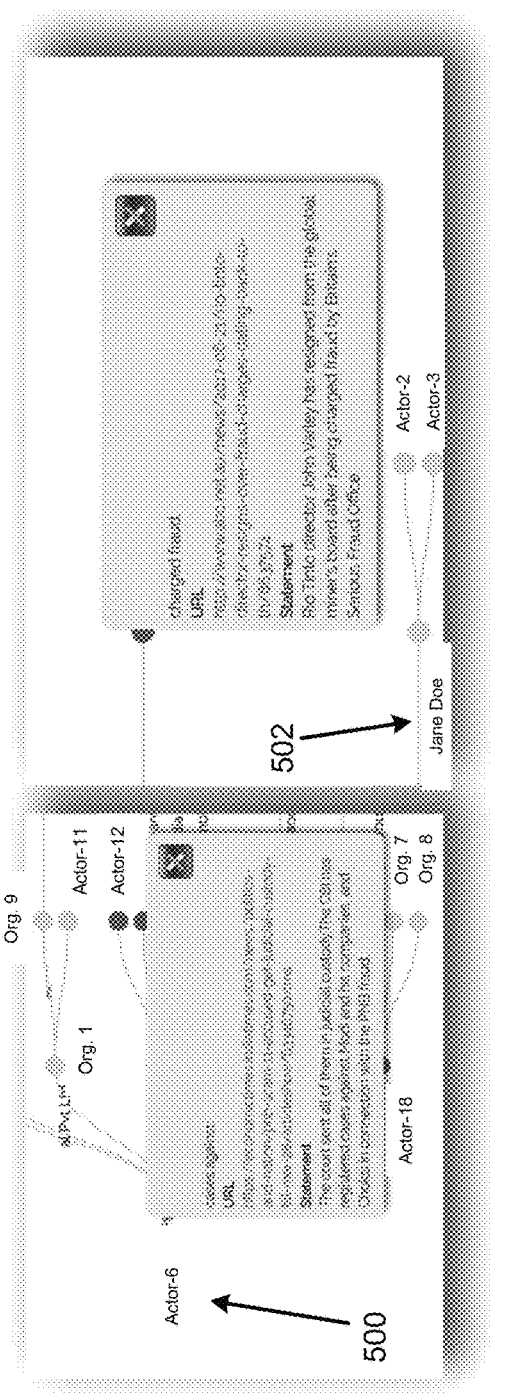
LOCATION
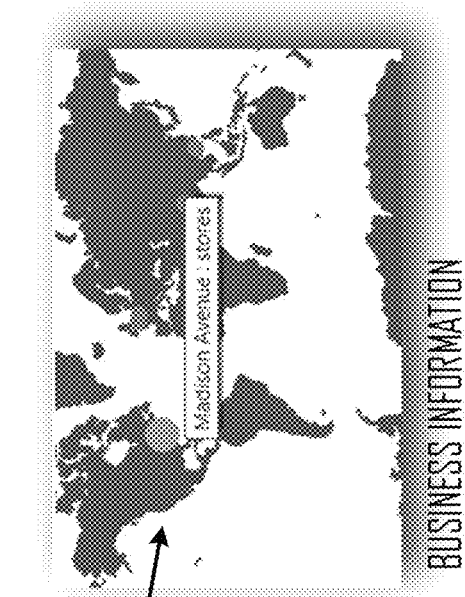
BUSINESS INFORMATION
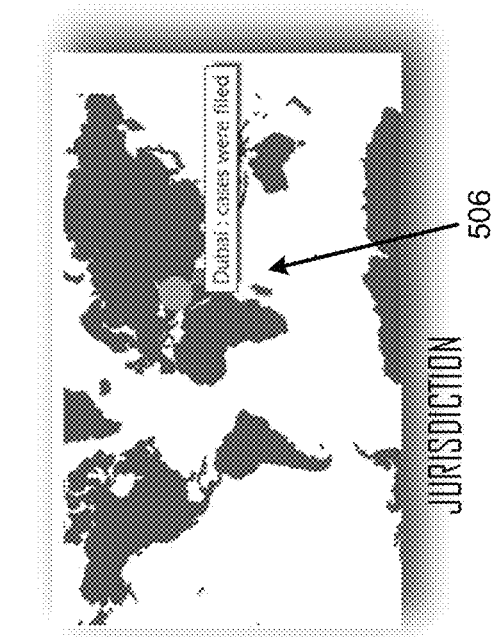
JURISDICTION
FIG. 5

What is going on with Target entity

Suggested Actions

1000 → 1. Trigger Enhanced Due Diligence (Medium Risk)

▲ Notified Onboarding Officer

1002 → 2. Freeze Account (High Risk)

Show worldwide sources of this informat...

Article Locations — Top 5

| | |
|---|---|
| ✦ India | 6 |
| ✦ China | 2 |
| ✦ United States Of America | 2 |
| ✦ France | 1 |
| Germany | 1 |

ASCERTAIN, BY AT LEAST ONE HARDWARE PROCESSOR, A TARGET ENTITY
1202

DETERMINE, BY THE AT LEAST ONE HARDWARE PROCESSOR, A SUBGRAPH ASSOCIATED WITH THE TARGET ENTITY FROM A BI-DIRECTION ROOTLESS GRAPH OF LINKED NAMED ENTITIES IDENTIFIED IN TEXT FROM A CORPUS OF DOCUMENTS, WHEREIN THE SUBGRAPH INCLUDES A BIDIRECTIONAL, ROOTLESS PORTION OF THE GRAPH COMPRISING THE TARGET ENTITY AND N-LEVELS OF ENTITIES LINKED TO THE TARGET ENTITY
1204

CONVERT, BY THE AT LEAST ONE HARDWARE PROCESSOR, THE SUBGRAPH TO A POINT-OF-VIEW (POV) TREE WITH THE TARGET ENTITY AS A ROOT NODE
1206

CALCULATE, BY THE AT LEAST ONE HARDWARE PROCESSOR, A SCORE FOR THE TARGET ENTITY
1208

DETERMINE, BY THE AT LEAST ONE HARDWARE PROCESSOR AND BASED ON THE SCORE FOR THE TARGET ENTITY, A RISK CATEGORY ASSOCIATED WITH THE TARGET ENTITY
1210

CONTROL, BY THE AT LEAST ONE HARDWARE PROCESSOR, AN OPERATION ASSOCIATED WITH THE TARGET ENTITY BASED ON THE RISK CATEGORY ASSOCIATED WITH THE TARGET ENTITY
1212

FIG. 12

NATURAL LANGUAGE PROCESSING AND ARTIFICIAL INTELLIGENCE BASED SEARCH SYSTEM

PRIORITY

This application is a Non-Provisional application of commonly assigned and co-pending Indian Provisional Application Serial Number 201811015862, filed Apr. 26, 2018, the disclosure of which is hereby incorporated by reference in its entirety.

BACKGROUND

An Internet search is typically conducted by entering search terms in a search engine. The search results are displayed and the user may go through each hit one-by-one to find the best results. This type of searching tends to be time consuming and does not always yield the most accurate search results.

BRIEF DESCRIPTION OF THE DRAWINGS

Features of the present disclosure are illustrated by way of example and not limited in the following figure(s), in which like numerals indicate like elements, in which:

FIG. 5 illustrates display of a uniform resource locator link associated with an entity corresponding to a selected node, according to examples of the present disclosure;

FIG. 10 illustrates an output that includes actions performed based on the output of FIG. 9, according to examples of the present disclosure;

FIG. 12 illustrates a flowchart of an example method for performing an NLP and artificial intelligence based search in accordance with an example of the present disclosure.

DETAILED DESCRIPTION

Figure 1:
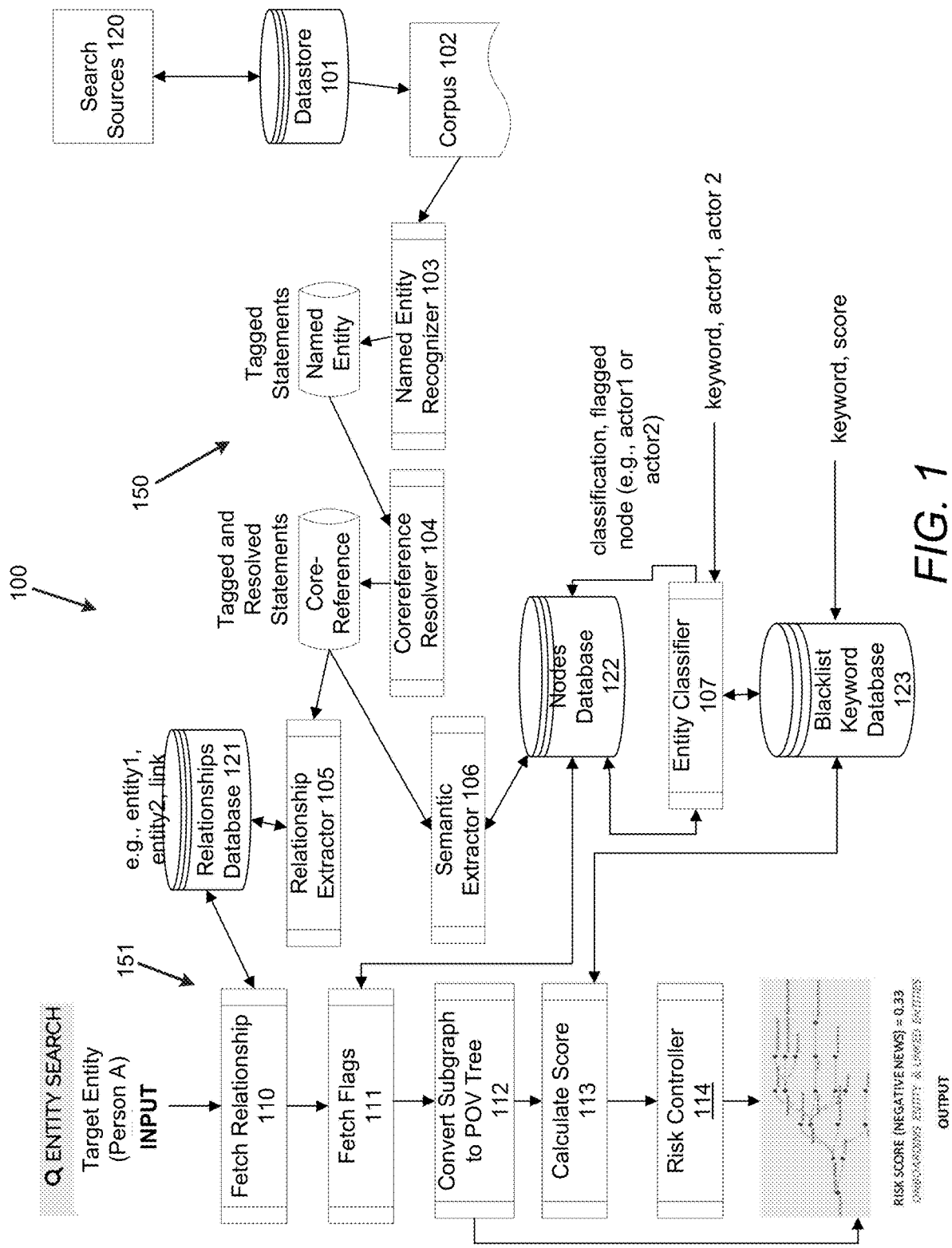
FIG. 1 illustrates a natural language processing (NLP) and artificial intelligence based search system, according to an example of the present disclosure.

For simplicity and illustrative purposes, the present disclosure is described by referring mainly to an example thereof. In the following description, numerous specific details are set forth in order to provide a thorough understanding of the present disclosure. It will be readily apparent, however, that the present disclosure may be practiced without limitation to these specific details. In other instances, some methods and structures readily understood by one of ordinary skill in the art have not been described in detail so as not to unnecessarily obscure the present disclosure. As used herein, the terms "an" and "an" are intended to denote at least one of a particular element, the term "includes" means includes but not limited to, the term "including" means including but not limited to, and the term "based on" means based at least in part on.

Natural language processing (NLP) and artificial intelligence based search systems, methods for performing NLP and artificial intelligence based search, and non-transitory computer readable media having stored thereon machine readable instructions to provide NLP and artificial intelligence based searching are disclosed herein. The systems, methods, and non-transitory computer readable media disclosed herein provide for customized entity-driven searches based on NLP techniques, including semantic extraction and other NLP techniques, and based on machine learning techniques, such as machine learning classifiers, and graph functions. The systems, methods, and non-transitory computer readable media disclosed herein provide more accurate and comprehensive search results through utilization of these techniques as is further described below.

In an example, the systems, methods, and non-transitory computer readable media disclosed herein may be used to conduct a search for a target entity to identify relationships with other entities. The systems, methods, and non-transitory computer readable media disclosed herein may analyze the identified relationships to find relationships that meet predetermined criteria. For example, the systems, methods, and non-transitory computer readable media disclosed herein may be used to conduct a search as part of a "Know Your Customer" (KYC) process. KYC processes may be used by a business to identify and verify the identity of its clients. For example, banking institutions may execute KYC processes to determine whether a client or a potential client may be linked or potentially linked to money laundering or other types of financial crimes. Typically, a KYC process may entail conducting an Internet search of the client to determine whether the client has been documented as being associated with financial crimes or being associated with people known to commit such crimes. These searches may fall short because it is difficult to identify from the searches whether the client is associated with negative news of a linked entity. For example, a linked entity of a client that is an organization may be a subsidiary of the organization, or a linked entity of a client that is a person may be an uncle, an aunt, or a cousin. From conventional Internet searches, it can be difficult to identify these linked entities and whether any of these linked entities may be associated with financial crimes or other negative news. The systems, methods, and non-transitory computer readable media disclosed herein, according an example of the present disclosure, may be used in KYC processes to conduct searches to identify relationships between a target entity and related entities that may be of interest to the user, and to provide a bi-directional graph showing the relationships. Also, the systems, methods, and non-transitory computer readable media disclosed herein may identify nodes of interest in the bi-directional graph that may be associated with negative news or other predetermined criteria. Additionally, the systems, methods, and non-transitory computer readable media disclosed herein may rank and/or score search results based on the graph and specified criteria. The systems, methods, and non-transitory computer readable media disclosed herein are not limited to being used for KYC processes. The systems, methods, and non-transitory computer readable media disclosed herein may be used for a variety of processes that need to perform targeted searches to identify relationships that meet predetermined criteria. For example, the systems, methods, and non-transitory computer readable media disclosed herein may be used for regulatory compliance and investigations to identify potential nefarious relationships of a target person. The systems, methods, and non-transitory computer readable media disclosed herein may be used for sales prospecting to identify potential sales customers of a target organization or business. The systems, methods, and non-transitory computer readable media disclosed herein may be used for market risk and for trade advising.

The systems, methods, and non-transitory computer readable media disclosed herein, according to an example of the present disclosure, provide technical improvements over conventional Internet searching by using NLP and machine learning to automate searching and for generating more accurate search results for a target entity. A target entity may include anything that can be the subject of a search and for which n-levels (where n is an integer greater than 1) of relationships to the subject need to be determined. In examples, the target entity may be a person or an organization. The systems, methods, and non-transitory computer readable media disclosed herein may use NLP and machine learning techniques to identify the relationships and to identify any entities related to the target entity that meet predetermined criteria through machine learning classification.

For the systems, methods, and non-transitory computer readable media disclosed herein, the elements of the systems, methods, and non-transitory computer readable media disclosed herein may be any combination of hardware and programming to implement the functionalities of the respective elements. In some examples described herein, the combinations of hardware and programming may be implemented in a number of different ways. For example, the programming for the elements may be processor executable instructions stored on a non-transitory machine-readable storage medium and the hardware for the elements may include a processing resource to execute those instructions. In these examples, a computing device implementing such elements may include the machine-readable storage medium storing the instructions and the processing resource to execute the instructions, or the machine-readable storage medium may be separately stored and accessible by the computing device and the processing resource. In some examples, some elements may be implemented in circuitry.

FIG. 1 illustrates a block diagram of the NLP and artificial intelligence based search system, according to an example of the present disclosure, which is shown as the system 100. The system 100 may include a subsystem 150 that builds a corpus of documents, determines relationships of interest between identified entities, and generates a graph of the relationships. The system 100 also includes a subsystem 151 that may operate to determine n-level deep relationships for a target entity and generate visualizations representing the relationships and score a target entity based on the n-level deep relationships and other criteria.

The subsystem 150 is described first. For example, the subsystem 150 may search documents from a variety of sources, including the Internet, private, and public databases, etc. The sources are shown as search sources 120. The subsystem 150 may store documents from the search sources 120 in datastore 101. The documents may include news articles, web pages, etc. The documents stored in the datastore 101 may be referred to as a corpus 102. The corpus 102 may be built from a one-time load of documents from selected sources, and then feeds from one or more of the sources may be setup to feed the corpus 102.

The subsystem 150 may include named entity recognizer 103 and coreference resolver 104. The named entity recognizer 103 may perform named entity recognition on the corpus 102 to identify entities from text in documents in the corpus 102, and classify them as people, organizations, or in other categories. For example, text from a news article in the corpus 102 may include John Doe as chief executive officer (CEO) of Acme Corp. The named entity recognition may identify John Doe as a person, and Acme Corp. as an organization. The named entity recognizer 103 may perform named entity recognition by first segmenting and tokenizing sentences. Once tokenized, each sentence may undergo part-of-speech tagging, which assigns a part-of-speech to each token/word such as, noun, verb, adjective, etc. Named entities may then be detected via parsing based on a grammar on top of the part-of-speech tagged sentences. In an example, the Stanford Named Entity Recognizer (NER) or another type of NER software may be used for the named entity recognizer 103.

The coreference resolver 104 may determine expressions that refer to the same entity in text. For example, the coreference resolver 104 may resolve "he" to be Barack Obama in the following statement: Barack Obama was the 44st president of the United States, and he is married to Michelle. With respect to resolution of coreferences, the coreference resolver 104 may first perform mention detection to detect boundaries of the mentions of text, and then identify coreference chains. Mention detection may be performed via part-of-speech tagging and parsing by recursively visiting a parse tree to include pronouns, proper names, and noun phrases as mentions. In an example, the coreference resolver 104 may include the Stanford CorefAnnotator, but other types of eight coreference resolvers may be used.

The coreference resolver 104 may resolve expressions tagged with named entities that are output from the named entity recognizer 103. The coreference resolution may be used to determine relationships of the tagged named entities. With respect to named entity tagging, the expression "Barack Obama was the 44st president of the United States, and he is married to Michelle" may include named entity tagging as follows:

(Barack Obama)/PERSON is President of (United States)/LOCATION.

He is married to (Michelle Obama)/PERSON

Further, this expression may include core reference tagging as follows:

(Barack Obama)/MENTION is President of United States.

He is married to (Michelle Obama)/MENTION

Subsystem 150 further includes relationship extractor 105, semantic extractor 106, and entity classifier 107. The relationship extractor 105 may perform customized extraction to determine relationships of named entities tagged by the named entity recognizer 103 and based on the output of the coreference resolver 104. Relationship extraction may include linking two entities from unstructured text sources. According to an example, relationship extraction may be performed by chunking the output of entity detection using either a regular expression or grammar. Combinations of named entity recognition tags along with relationship keywords may be searched for in a specific format/placement. Supervised or semi-supervised relationship extraction may be performed to determine the relationships of the named entities. Stanford relation extractor is an example of a relationship extractor 105 that may be used to find relationships between two entities. Information identifying the relationships determined by the semantic extractor 106 and a graph and subgraphs including the relationships may be stored in the relationships database 121.

In an example, the relationship extractor 105 includes customized regular expression (regex) matching to identify different types of relationships. With respect to customized regular expression (regex) matching to identify different types of relationships, examples may include [PERSON]* [PERSON-to-PERSON Relationship Keyword]*[PERSON] patterns that may be extracted where * represents any other part of speech tag but not PERSON, ORGANIZATION or LOCATION. [PERSON] may be replaced by [ORGANIZATION] and [LOCATION] as well. For example, relationships may include person-to-person (blood relative such as daughter, social relationship such as engaged, distant relative such as maternal uncle, etc.), person-to-organization (e.g., vested interest such as director), organization-to-person (e.g., transactional such as loaning to a person), and organization-to-organization (e.g., subsidiary). Keywords may be specified to perform regex matching to identify entities and their relationships. Examples of keywords may include the following: person-to-organization: analyst, president, chairman, trader scientists economist, engineer, manager; person-to-person—father, brother, sister, mother, lawyer, client; organization-to-organization—division, subsidiary, rival, joint, spinoff, affiliate; and organization-to-person—under, headed by, etc.

The relationship extractor 105 may generate a directed graph of the relationships between the identified identifies, and the graph may be updated as new information is received. The graph may be rootless and all possible links between entities may be included in the graph. The graph may be denoted a bi-directional rootless graph. Subgraphs may be created from constellations (e.g., non-connected sections) in the graph and stored in the relationships database 121. The subgraph may represent all possible direct and indirect connections of a target entity. That is, a subgraph may include all nodes that are reachable from a target entity. The graph may include various subgraphs, where each subgraph is not connected to any other subgraph.

The semantic extractor 106 may perform semantic role labeling. Semantic role labeling may include an NLP technique that assigns labels to words or phrases in a sentence that indicate their semantic role in the sentence. With respect to determination of semantic relationships from text of named entities, semantic role labeling may be performed by creating a pipeline of linear classifiers including predicate disambiguation, argument identification, and argument classification. Thereafter, a pool of candidates may be generated, and further ranked using, for example, joint learning that combines linear classification models and proposition features. An example of semantic role labeling may include Ms. Reiss-Andersen' (Subject) 'will succeed' (Semantic Relation) 'previous chairwoman of Norwegian Nobel Committee' (Object). Semantic role labeling may also include the detection of the semantic arguments associated with a predicate or verb of a sentence and their classification into their specific roles.

According to an example of the present disclosure, semantic role labeling may be based on keywords, such as stored in blacklist keywords database 123, which may be used to identify predetermined information, such as negative news, for an entity. Although not shown, the semantic extractor 106 may be connected to the blacklist keywords database 123 to determine whether verbs determined from the semantic role labeling are blacklist keywords. If a verb is identified as a blacklist keyword, machine learning classification performed by the entity classifier 107 may use this information to flag a node as is further discussed below.

For example, for the sentence "Commissioner Gordon arrests the Joker" that may be extracted from text in a document in the corpus 102, "Gordon" and "Joker" may be identified as entities, such as by the named entity recognizer 103. Also, the semantic extractor 106 may determine the verb "arrests" provides semantic information for "Gordon" and "Joker." The semantic extractor 106 may then determine whether "arrests" is a blacklist keyword in the blacklist keywords database 123. If so, then the keyword and entities, i.e., "arrests", "Gordon" and "Joker", may be provided as input to the entity classifier 107 (shown as keyword, actor1, actor2). Based on a determination that "Gordon" or "Joker" are actors 1 and 2, and the entity classifier 107 may execute machine learning classification based on the keyword "arrests" and based on the actors. Further, which actor is a predicate in this case may be identified using semantic relationships and classified into use cases using, for example, the Naïve Bayes Classifier. The output may include a classification of the phrase "Commissioner Gordon arrests the Joker" into a particular category. In this regard, semantic role labeling may include multiple or multi-step classification sub tasks in pipeline systems. These sub tasks may include predicate identification and disambiguation, argument identification, and classification. In this case, the phrase may be classified into a high-risk category, and then based on the identified category, rules may be applied to determine whether to select actor 1 or actor 2. For example, a rule may state that for the high-risk category, select actor 2, i.e., "Joker", as the entity or actor to be flagged. In other situations, the system 100 may be used for other applications, such as sales prospecting, trading assessment, etc. In these situations, the machine learning classification performed by the entity classifier 107 may classify the phrase into a different category associated with the particular use, such as a category for sales lead for sales prospecting. Based on the category, different rules may be applied to determine whether to select actor 1 or actor 2 from the phrase to flag. Accordingly, the system may include a rules-based approach that selects rules to apply based on the machine learning classification, and application of the selected rules determines which actor or entity to flag.

The actor or entity selected for flagging by the output of the entity classifier 107 may be flagged in nodes database 122 that stores nodes for the relationship graph created by the relationship extractor 105. For example, named entities that are linked may be stored as nodes in the nodes database 122, and data may be stored for the nodes that indicates whether a particular node is flagged. When a visualization of a graph is created, the nodes may be flagged in the visualization as well. The nodes database 122 may be queried to identify the nodes that are flagged for the visualization.

Figure 2:
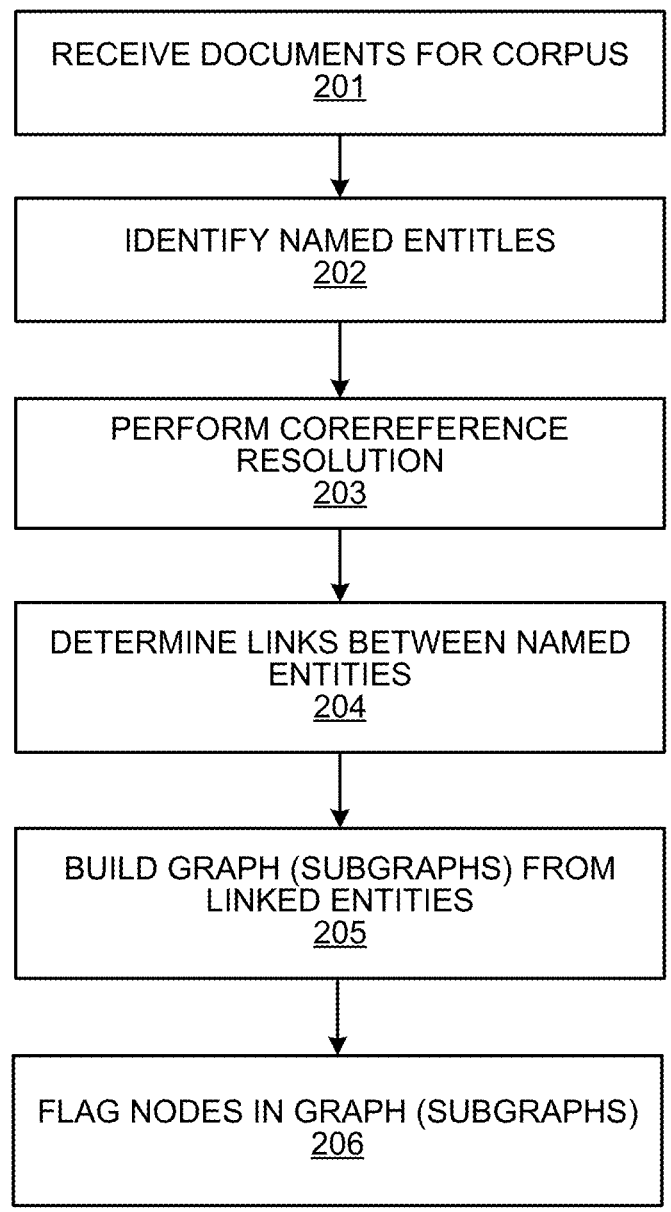
FIGS. 2-3 illustrate methods, according to examples of the present disclosure.

FIG. 2 shows a method 200 that may be performed by the subsystem 150. At 201, documents may be received for the corpus 102. The documents may be received in an initial loading stage, and documents may be subsequently received from a feed of selected data sources.

At 202, named entity recognition may be executed to identify named entities in text in the documents in the corpus 102, and the text may include unstructured text in the documents.

At 203, from the text tagged with named entities, coreference resolution may be executed to resolve pronouns in the text to identify whether the pronouns resolve to the named entities in the text. Thus, the coreference resolver 104 may resolve references in the text with the identified named entities.

Figure 4:
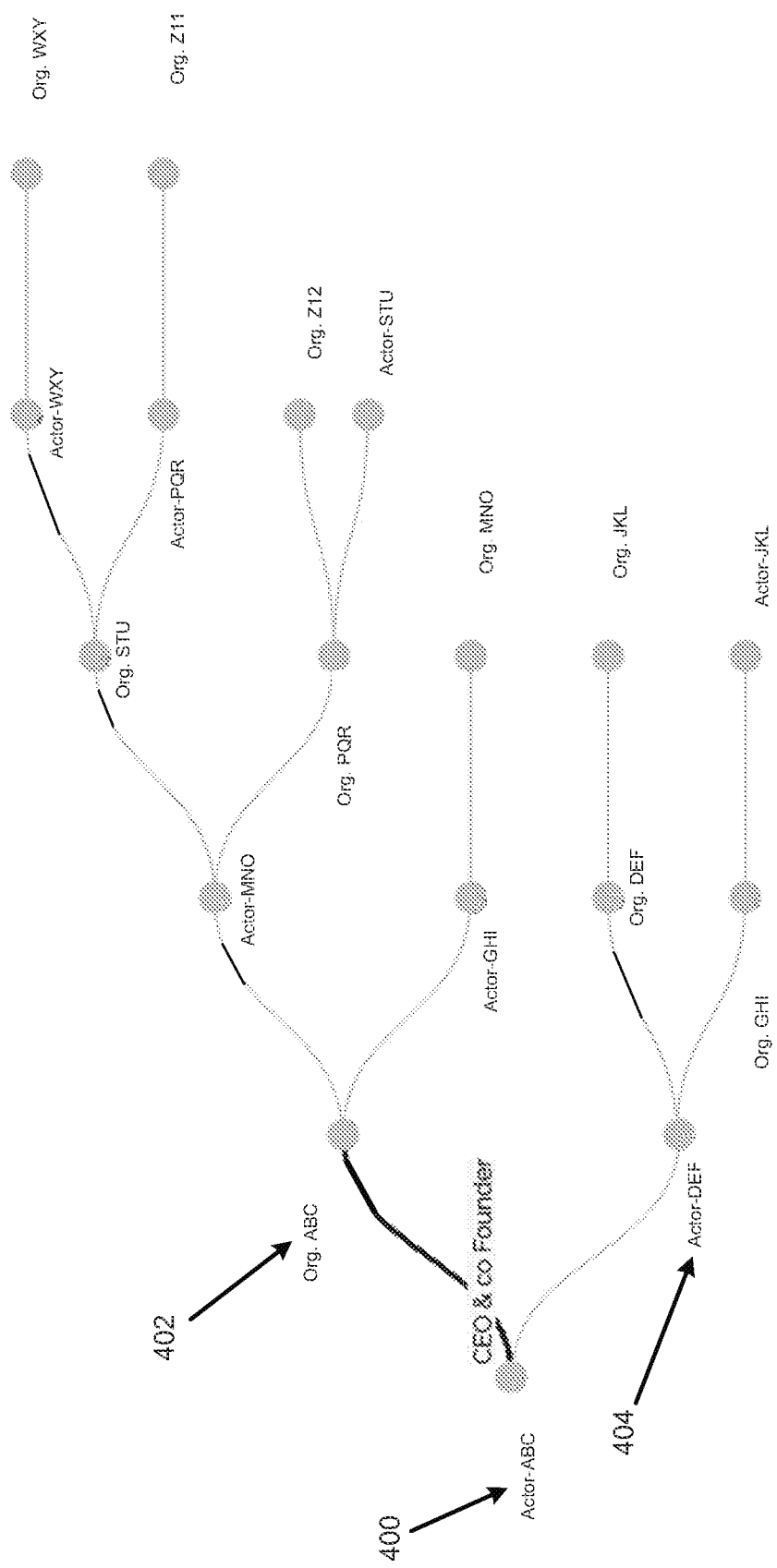
FIG. 4 illustrates links between named entities, according to examples of the present disclosure.

At 204, links between the named entities may be determined from the output of 202 and 203. For example, FIG. 4 illustrates links between named entities. In this regard, a named entity (e.g., Actor-ABC) at 400 may be linked to a named entity (e.g., Organization ABC, abbreviated as Org. ABC) at 402, a named entity (e.g., Actor-DEF) at 404, etc.

At 205, a graph (e.g., the bi-direction rootless graph) may be generated from the linked entities.

At 206, nodes may be flagged based on semantic extraction and machine learning classification, such as described with respect to semantic extractor 106 and entity classifier 107. In this regard, for any nodes that are flagged (e.g., node 500, and node 502), FIG. 5 illustrates display of a uniform resource locator link to a news article associated with the entity corresponding to the node. Thus, a mouse over or another type of selection of a flagged node may result in display of a news article, or other information with respect to the node. Further, information such as a location associated with the entity corresponding to the node may be displayed as shown at 504 and 506, which respectively correspond to nodes 500 and 502.

The nodes that are flagged at 206 may include a temporal marker associated, for example, with the time of the flagging and/or the time of obtaining of the documents. For example, nodes that are flagged for documents from a particular year may be marked according to that particular year. For documents obtained for another year, nodes that are flagged for documents from the other year may be marked according to other year, etc. In this manner, risk assessment as disclosed herein may be provided for different years for comparison and/or for understanding of why risk assessment for a target entity has increased or decreased between different years.

The subsystem 151 is now described with reference to FIG. 1. The subsystem 151 may execute a process at runtime to run a search for a target entity. The process performed by the subsystem 151 is described below.

At 110, the subsystem 151 may receive a target entity for conducting a search, and retrieve a subgraph for the target entity. For example, the system 100 may generate a user interface that allows a user to enter a target entity, or a target entity may be received from another system. A subgraph for the target entity may be retrieved from the relationships database 121.

At 111, flags, if any, for nodes in the subgraph may be retrieved from the nodes database.

At 112, the subgraph may be converted to a point-of-view (POV) tree. As discussed above, the graph and subgraphs created by the relationship extractor 105 may include a rootless bi-directional graph with links between the entities. The subgraph maybe converted to POV tree by making the target entity the root. Method 300 discussed below includes substeps for step 112 for converting a rootless graph to a POV tree. A visualization of the POV tree showing flagged nodes may be output by the system.

At 113, a score may be generated for the target entity, such as discussed below with respect to Equation (1).

Figure 3:
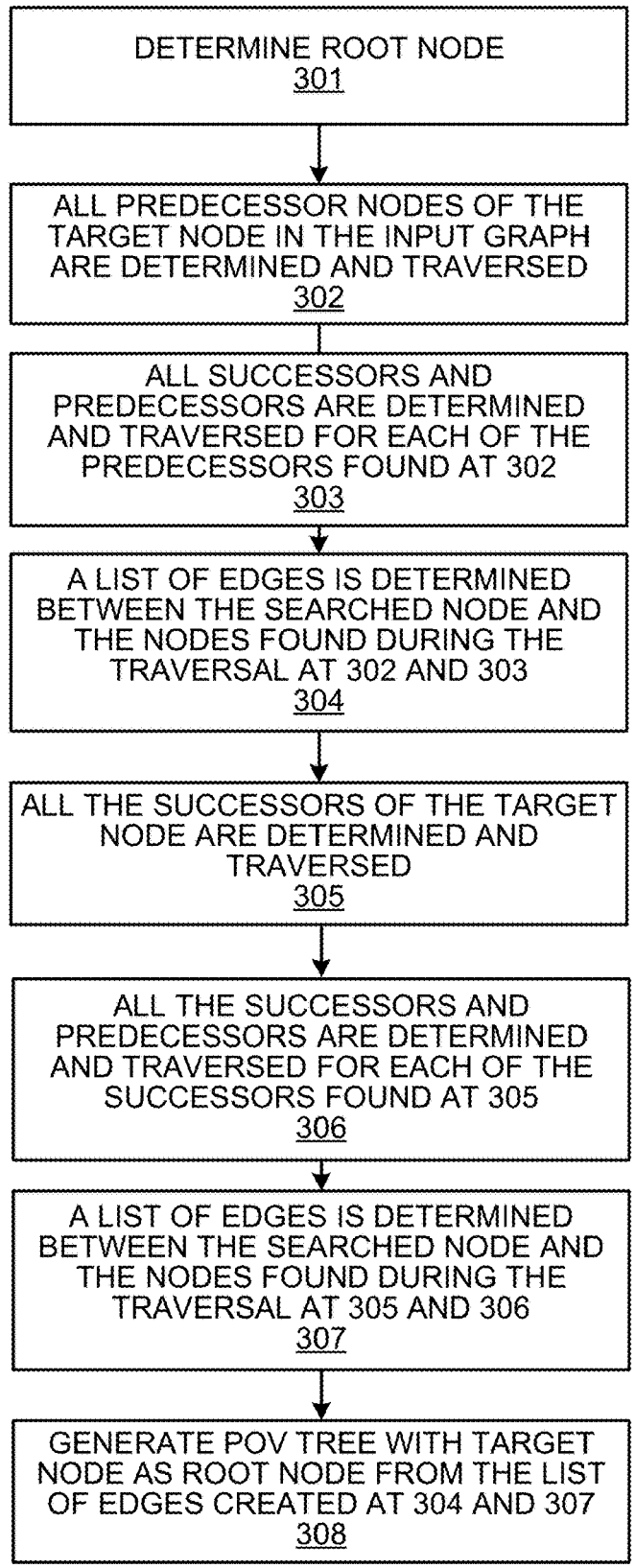

Referring to FIG. 3, the method 300 is now described for converting a rootless graph to a POV tree, and the method 300 may be performed for step 112.

Figure 7B:
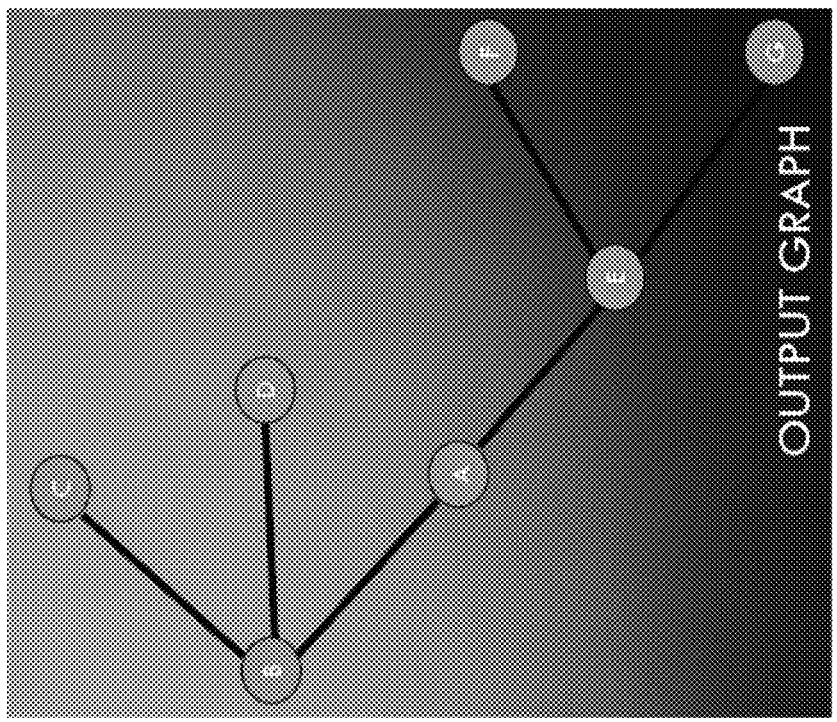
FIGS. 7A, 7B, and 8 illustrate examples of subgraphs and trees, according to examples of the present disclosure.
Figure 7A:
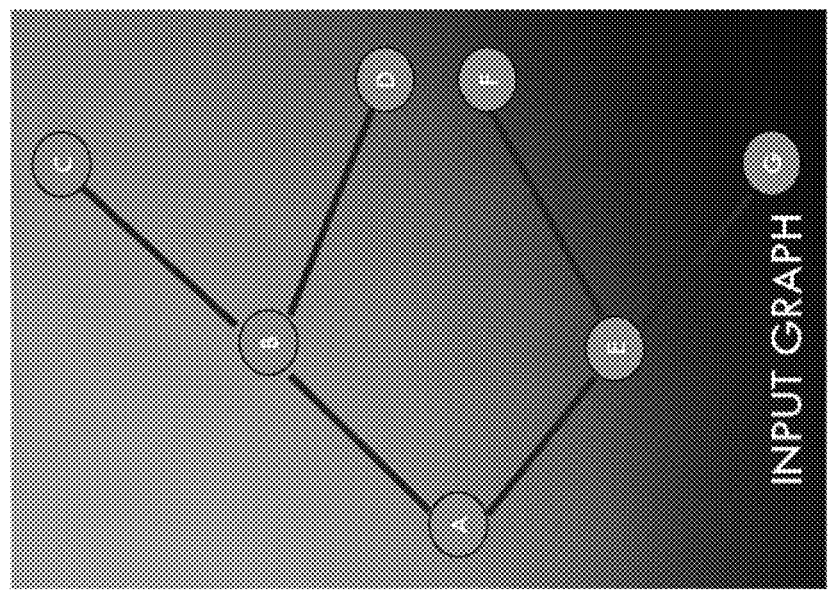

At 301, a target node is determined. For example, the target entity may be set as the target node. The target node may become a root node for a POV tree being generated from a subgraph according to the method 300. For example, a subgraph including the target node may be retrieved. The subgraph may be a portion of the graph generated by the relationship extractor 105 that includes the target node. The subgraph may include the target node for the target entity and nodes connected to the target entity. For example, FIG. 7A shows an example of a rootless bidirectional subgraph for a target node B and is referred to in following steps. This subgraph may become an input to the method 300, along with an indication of which node, e.g., target node B, is the target node.

At 302, all predecessor nodes of the target node in the input graph may be determined and traversed; e.g., B→A.

At 303, all successors and predecessors may be determined and traversed for each of the predecessors (e.g., A) found at 302; e.g., A→E, E→F, F→G.

At 304, a list of edges may be determined between the target node and the nodes found during the traversal at 302 and 303; e.g., B→A, A→E, E→F, E→G.

At 305, all the successors of the target node are determined and traversed; e.g., B→C, B→D.

At 306, all the successors and predecessors are determined and traversed for each of the successors found at 305; e.g., no successors of C and D.

At 307, a list of edges is determined between the target node and the nodes found during the traversal at 305 and 306; e.g., B→C, B→D.

At 308, the list of edges created at 304 and 307, e.g., B→A, A→E, E→F, E→G, B→C, B→D, may be passed to a graph generator, such as Networkx Digraph or other graph generator software, and an output graph may be generated for the input graph with the root node set as the target node and its successors and predecessors become the children for the root node (i.e., the POV tree for the target node from the input subgraph). The output graph is shown in FIG. 7B.

As discussed in step 113 above, a score may be determined for the target entity. Equation (1) below may be used to calculate a score for the target entity.

$$\gamma = \sum_{i=1}^{n} \frac{\max(f(x_{i1}, \ldots, x_{ik}))}{i}; \quad \text{where } \gamma = \gamma \text{ if } \gamma < 1; \text{ and } \gamma = 1 \text{ if } \gamma > 1 \qquad \text{Equation (1)}$$

In Equation (1), n=maximum level of tree; f(x)=weight of a node; and k is the number of nodes at each level 1.

Figure 6:
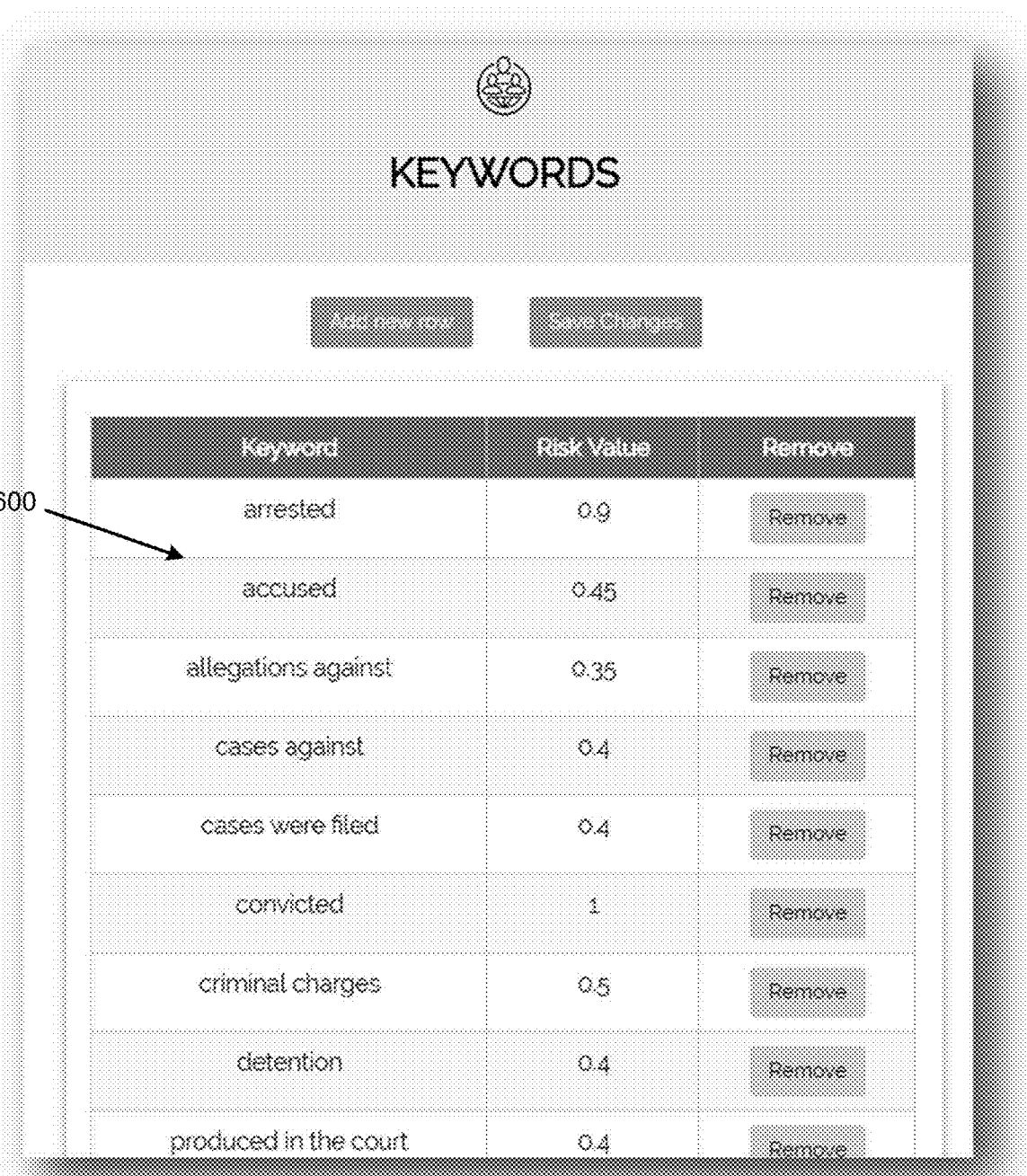
FIG. 6 illustrates configurability of keywords and their associated scores, according to examples of the present disclosure.

The score calculated by Equation (1) is for the target entity, and may be based on weights of entities linked to the target entity at different levels of the POV tree. For example, a maximum risk score may be determined for each level. To determine the maximum score for a level, scores may be determined for each node in a level and the maximum score may be selected. In an example, a score may be assigned to a node based on a keyword associated with the node. For example, the blacklist keyword database 121 stores keywords and a score for keywords. Examples of keywords and their scores associated with negative news for KYC processes may include: convicted=1, arrested=0.9, caught=0.85, suspected=0.65, etc. In this regard, as shown in FIG. 6, the keywords and their associated scores may be configurable. For example, as shown at 600, arrested may include a score of 0.9, accused may include a score of 0.45, etc. The maximum risk score for a level may be divided by the level number, so the greater the level (e.g., greater the distance from the root node), the less the impact may be for the maximum risk score on the total score. The maximum risk scores divided by the levels may be summed to determine the score for the target entity. In an example, the score calculated by Equation (1) is a risk score for a target entity in a KYC process. The risk score runs between 0 and 1 inclusive.

Figure 8:
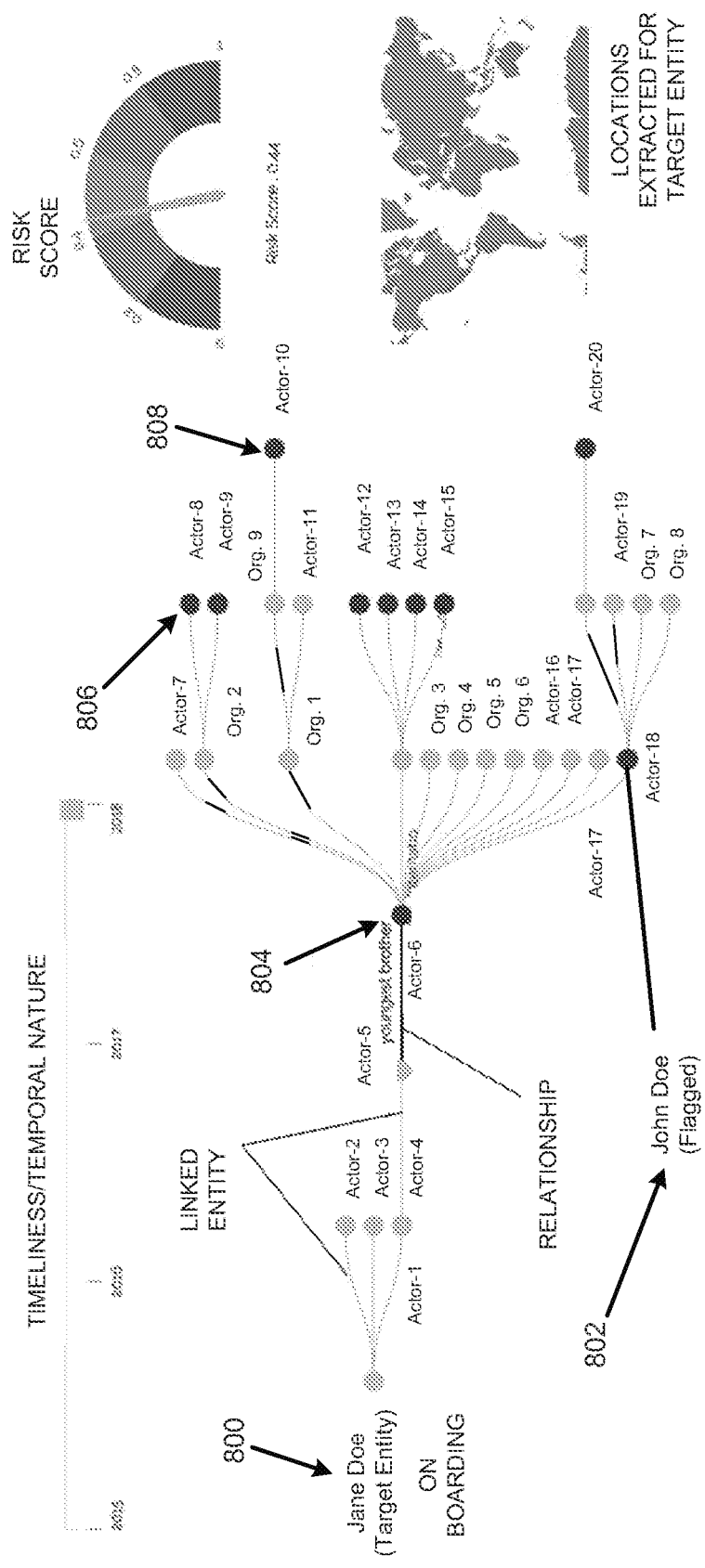

In addition to outputting a score, such as calculated according to Equation (1), the system 100 may also output a visualization of the POV tree with flagged nodes. FIG. 8 shows an example of a visualization of a POV tree. In this example, Jane Doe at 800 may be the target entity and becomes the root node, and each column of nodes represents a level in the n-level of nodes in the POV tree. The POV tree may include flagged nodes. For example, the node for John Doe at 802 may be flagged.

With respect to the node at 802 that is flagged, other nodes may also be flagged, such as the node at 804, the nodes at 806, the node at 808, etc. As disclosed herein, assuming that a keyword associated with the node at 802, which is at level 5, is "cases against" and includes a keyword weight of 0.4, a keyword associated with the node at 804, which is at level 4, is "charged fraud" and includes a keyword weight of 0.5, a keyword associated with the node at 806, which is at level 6, is "barred" and includes a keyword weight of 0.6, etc., these weight values may correspond to a maximum weight at level 5 of 0.4, level 4 of 0.5, level 6 of 0.6, etc. Based on these weight values, and other maximum weight values associated with the other levels that include flagged nodes, the risk score may be determined as 0.5/4+0.4/5+0.6/6+ (maximum weight of flagged nodes at other levels/level number). Assuming that only the nodes at levels 4, 5, and 6 were flagged, the risk score may be determined to be 0.305. According to an example, application of the risk determination may be limited to the target entity.

Figure 9:
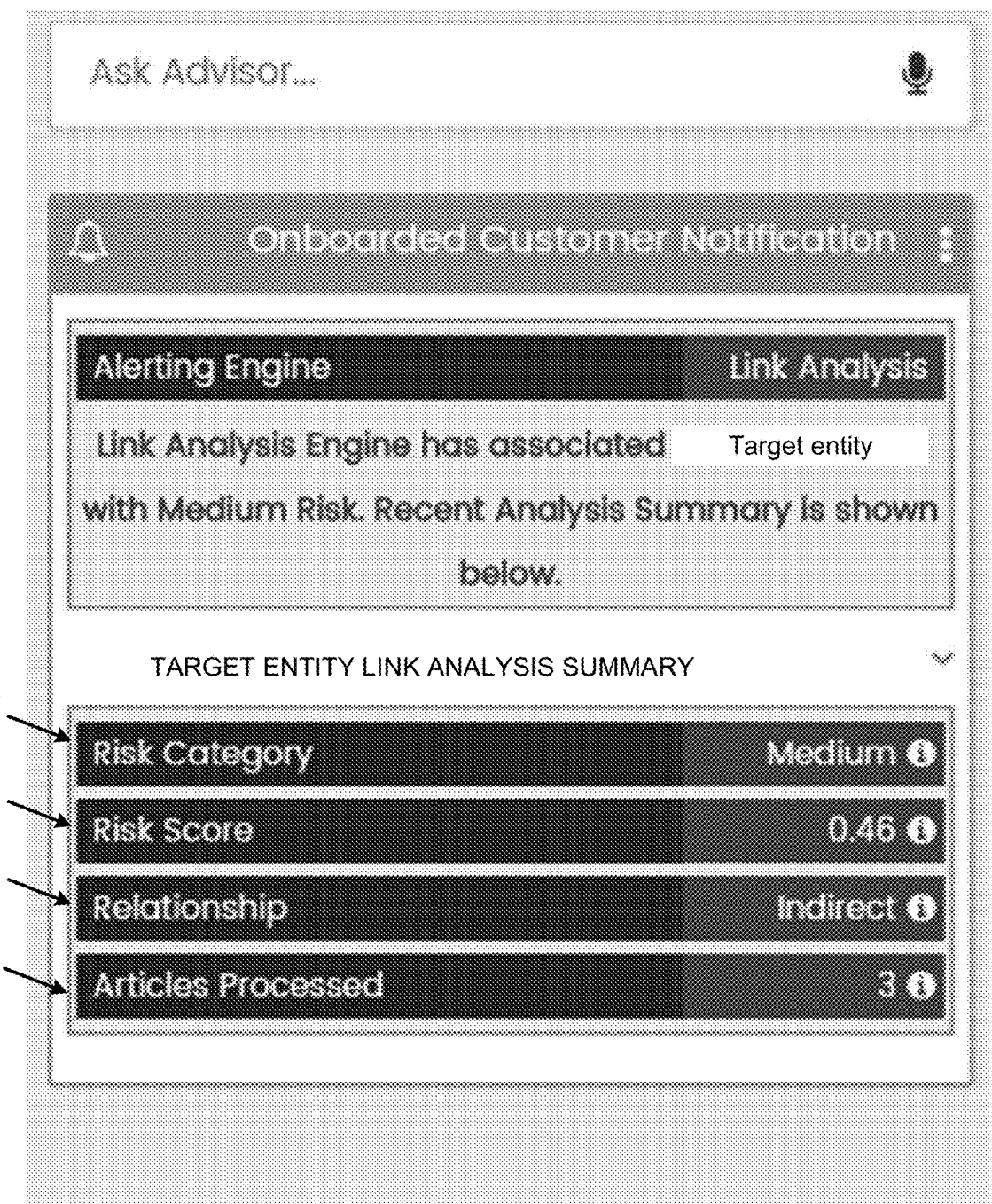
FIG. 9 illustrates an output that includes a risk category, a risk score, a relationship between a target entity and a flagged node, and a number of documents processed, according to examples of the present disclosure.

FIG. 9 illustrates an output that includes a risk category, a risk score, a relationship between a target entity and a flagged node, and a number of documents processed, according to examples of the present disclosure.

Referring to FIG. 9, an output of the system 100 may include, for example, a risk category at 900 (e.g., medium risk), a risk score at 902 (e.g., 0.46 on a scale of 0-1), a relationship between a target entity and an entity that is flagged at 904 (e.g., indirect), and a number of documents processed with respect to the corpus at 906 (e.g., three).

FIG. 10 illustrates an output that includes actions performed based on the output of FIG. 9, according to examples of the present disclosure.

Referring to FIG. 10, assuming that the risk category at 900 of FIG. 9 is determined to be "medium risk", at 1000, the risk controller 114 may perform an operation, such as, triggering of an enhanced investigation related to the target entity. Alternatively, assuming that the risk category at 900 is determined to be "high risk", at 1002, the risk controller 114 may perform an operation, such as, freezing of an account related to the target entity (e.g., disabling access related to the account related to the target entity). In this manner, based on a specification of the risk category determined for the target entity, the risk controller 114 may perform a predetermined operation to control a specified functionality related to the target entity.

According to another example of operation of the system 100, if the score is induced as part of linked (in-direct risk), an organization may designate the target entity into an enhanced risk category. For example, a low risk customer may become a medium or high risk customer depending on the score. According to another example, an Enhanced Customer Due Diligence (E-CDD) may be triggered. This would mean that the new risk discovered by the system 100 has cautioned an organization to ensure that there is no direct or indirect impact of this newly discovered risk.

Figure 11:
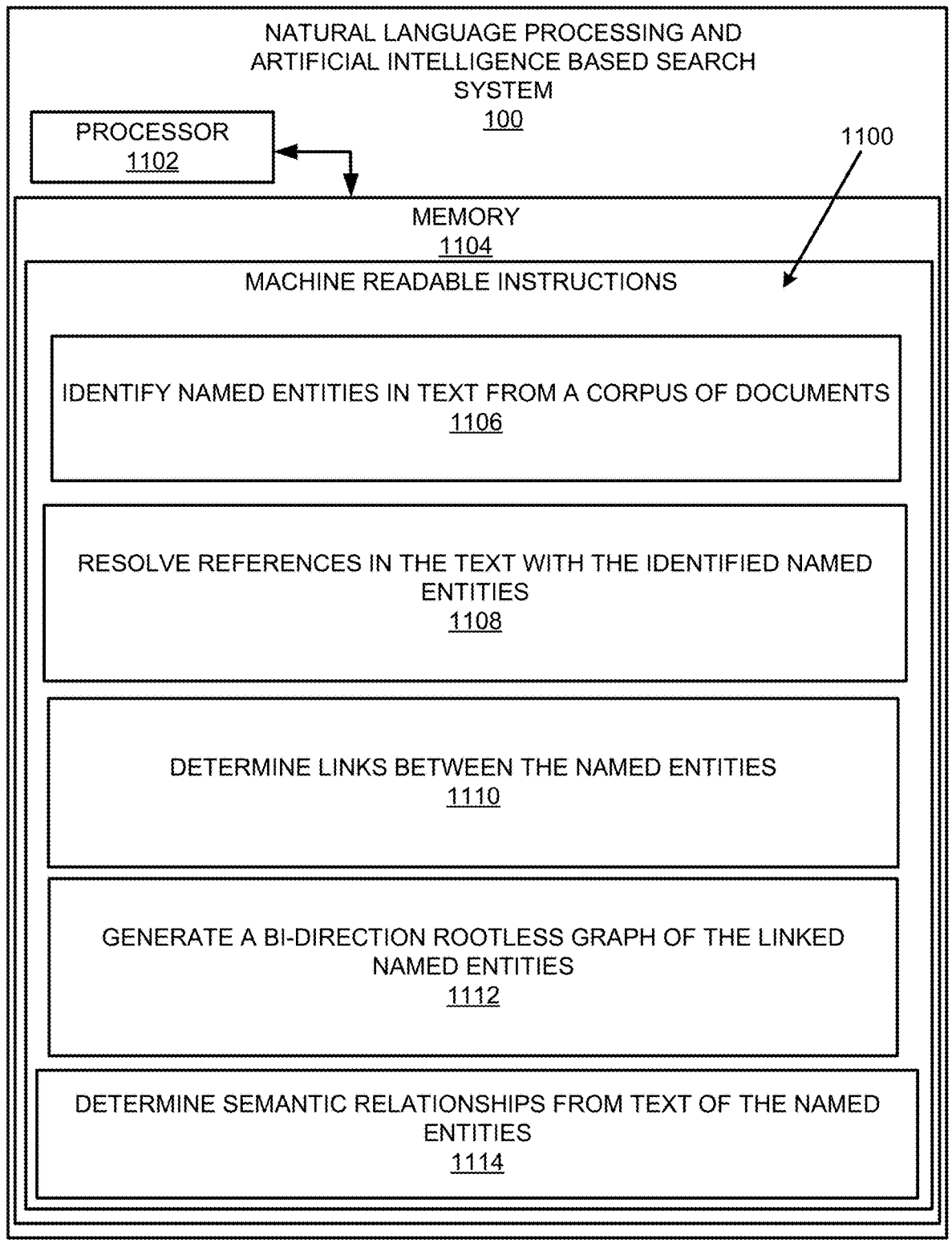
FIG. 11 illustrates an example block diagram for performing an NLP and artificial intelligence based search in accordance with an example of the present disclosure.
Figure 11:
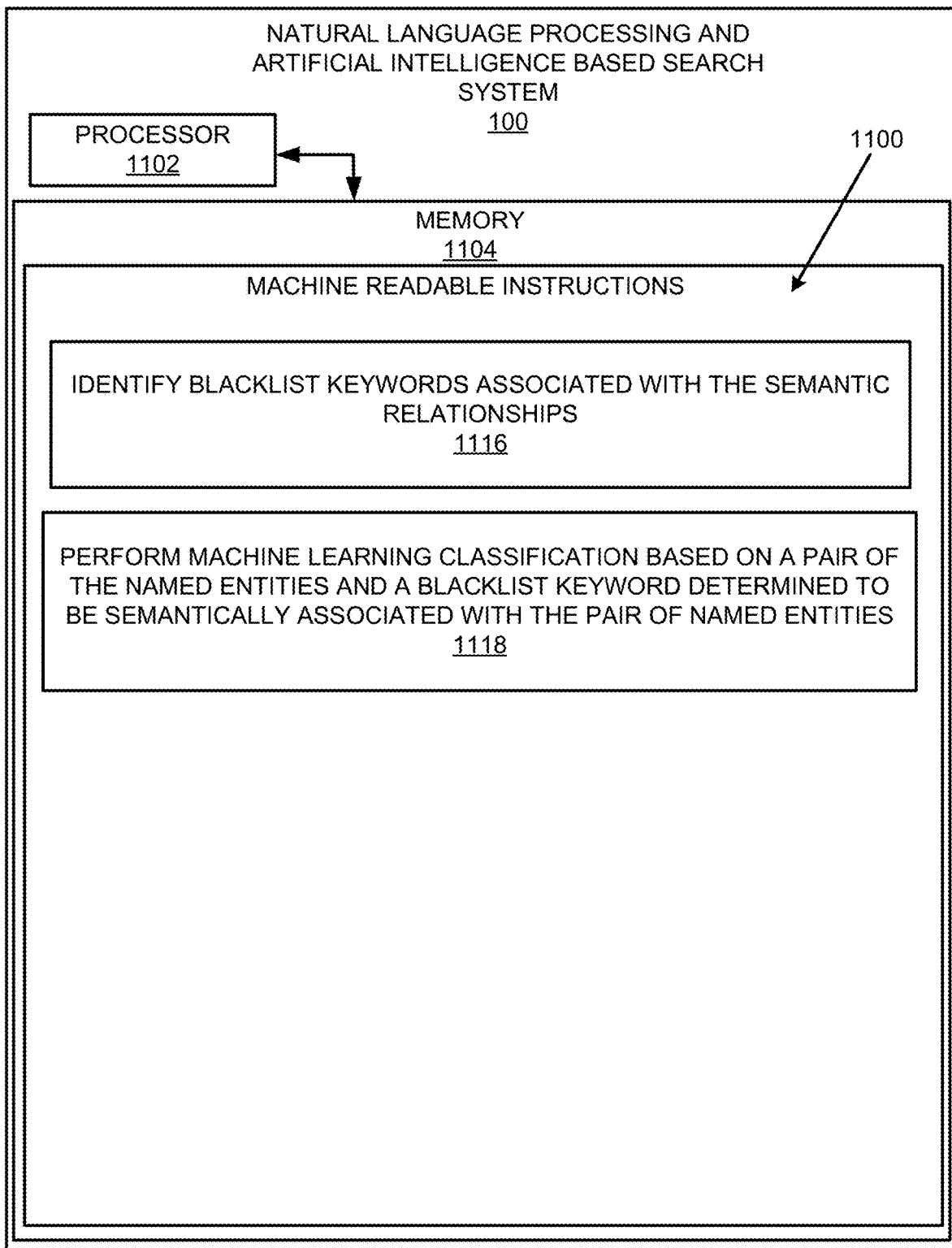
Figure 13:
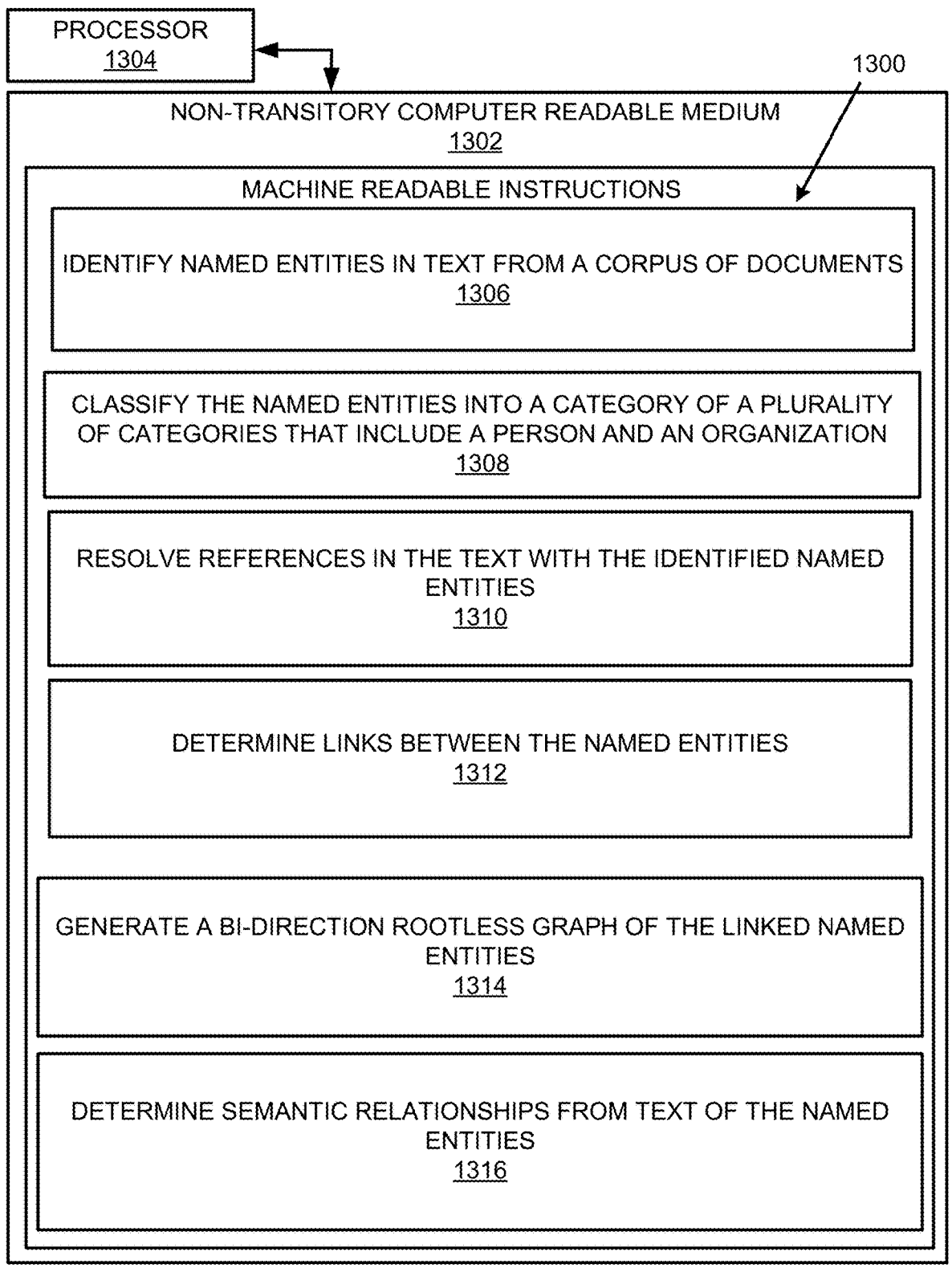
FIG. 13 illustrates a further example block diagram for performing an NLP and artificial intelligence based search in accordance with another example of the present disclosure.
Figure 13:
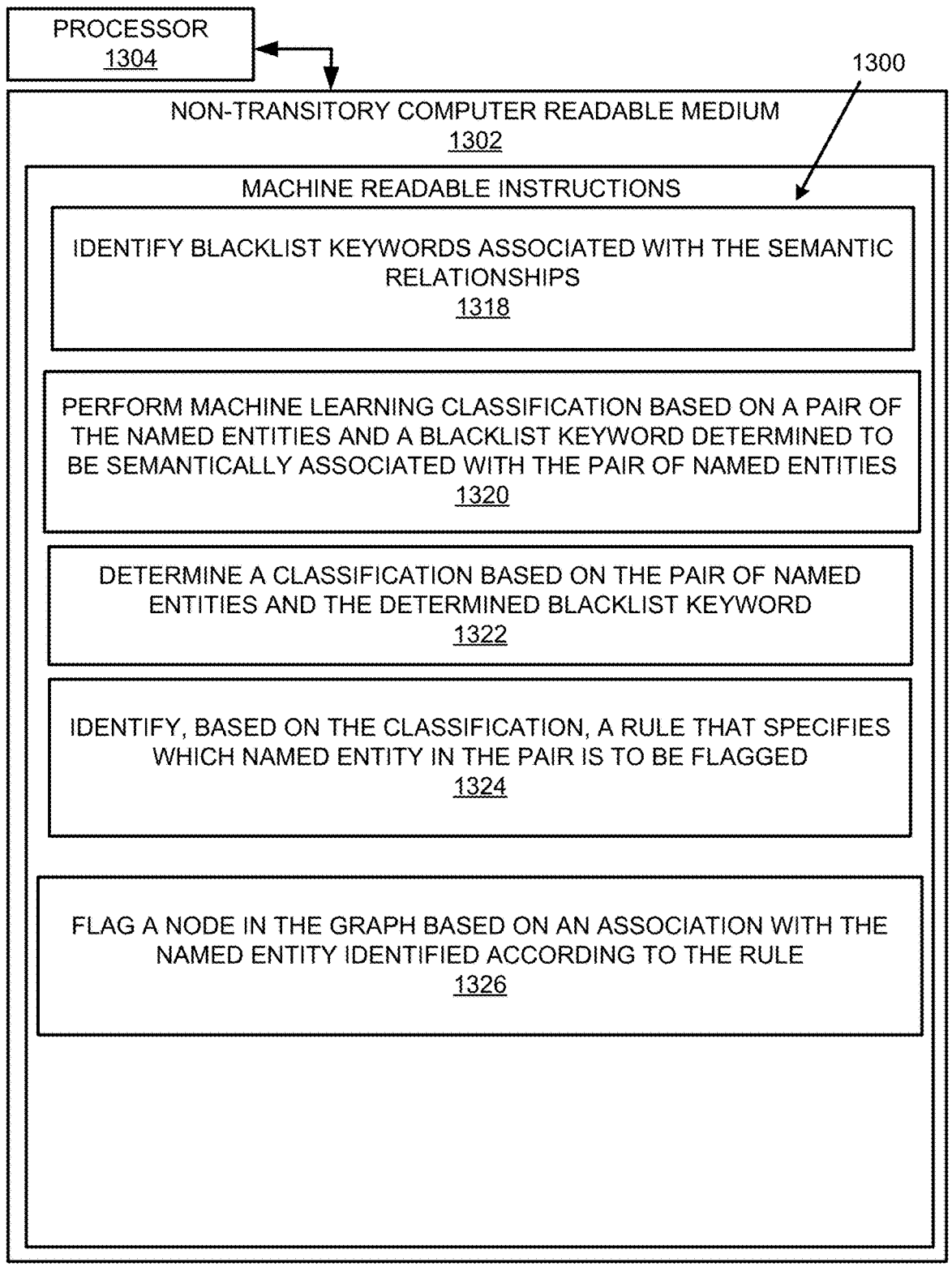

FIGS. 11-13 respectively illustrate an example block diagram 1100, a flowchart of an example method 1200, and a further example block diagram 1300 for NLP and artificial intelligence based search, according to examples. The block diagram 1100, the method 1200, and the block diagram 1300 may be implemented on the system 100 described above with reference to FIG. 1 by way of example and not of limitation. The block diagram 1100, the method 1200, and the block diagram 1300 may be practiced in other systems. In addition to showing the block diagram 1100, FIG. 11 shows hardware of the system 100 that may execute the instructions of the block diagram 1100. The hardware may include a processor 1102, and a memory 1104 storing machine readable instructions that when executed by the processor cause the processor to perform the instructions of the block diagram 1100. The memory 1104 may represent a non-transitory computer readable medium. FIG. 12 may represent an example method for performing NLP and artificial intelligence based searching, and the steps of the method. FIG. 13 may represent a non-transitory computer readable medium 1302 having stored thereon machine readable instructions to provide NLP and artificial intelligence based searching according to an example. The machine readable instructions, when executed, cause a processor 1304 to perform the instructions of the block diagram 1300 also shown in FIG. 13.

The processor 1102 of FIG. 11 and/or the processor 1304 of FIG. 13 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 1302 of FIG. 13), such as hardware storage devices (e.g., RAM (random access memory), ROM (read only memory), EPROM (erasable, programmable ROM), EEPROM (electrically erasable, programmable ROM), hard drives, and flash memory). The memory 1104 may include a RAM, where the machine readable instructions and data for a processor may reside during runtime.

Referring to FIGS. 1-11, and particularly to the block diagram 1100 shown in FIG. 11, the memory 1104 may include instructions 1106 to identify (e.g., by a named entity recognizer 103 that is executed by at least one hardware processor such as the hardware processor 1102) named entities in text from a corpus 102 of documents.

According to examples disclosed herein, the named entity recognizer 103 may identify named entities in text from the corpus 102 of documents by identifying the named entities from the text in the documents, and classifying the named entities into a category of a plurality of categories that include a person and an organization.

The processor 1102 may fetch, decode, and execute the instructions 1108 to resolve (e.g., by a coreference resolver 104 that is executed by at least one hardware processor such as the hardware processor 1102) references in the text with the identified named entities.

The processor 1102 may fetch, decode, and execute the instructions 1110 to determine (e.g., by a relationship extractor 105 that is executed by at least one hardware processor such as the hardware processor 1102) links between the named entities.

The processor 1102 may fetch, decode, and execute the instructions 1112 to generate (e.g., by a relationship extractor 105 that is executed by at least one hardware processor such as the hardware processor 1102) a bi-direction rootless graph of the linked named entities.

According to examples disclosed herein, the relationship extractor 105 may determine links between the named entities by identifying relationships between the named entities from a plurality of relationships that include person-to-person, person-to-organization, organization-to-person, and organization-to-organization. Further, the relationship extractor 105 may determine, based on the identified relationships between the named entities, the links between the named entities.

The processor 1102 may fetch, decode, and execute the instructions 1114 to determine (e.g., by a semantic extractor 106 that is executed by at least one hardware processor such as the hardware processor 1102) semantic relationships from text of the named entities.

The processor 1102 may fetch, decode, and execute the instructions 1116 to identify (e.g., by a semantic extractor 106 that is executed by at least one hardware processor such as the hardware processor 1102) blacklist keywords associated with the semantic relationships.

According to examples disclosed herein, the semantic extractor 106 may identify the blacklist keywords associated with the semantic relationships by identifying the blacklist keywords that include verbs associated with the semantic relationships.

The processor 1102 may fetch, decode, and execute the instructions 1118 to perform (e.g., by an entity classifier 107 that is executed by at least one hardware processor such as the hardware processor 1102) machine learning classification based on a pair of the named entities and a blacklist keyword determined to be semantically associated with the pair of named entities according to the semantic extractor 106.

According to examples disclosed herein, the entity classifier 107 may determine a classification based on the pair of named entities and the blacklist keyword by determining, based on the blacklist keyword, a classification category associated with the blacklist keyword from a plurality of classification categories, and assigning the determined classification category to the pair of named entities.

According to examples disclosed herein, the entity classifier 107 may determine a classification based on the pair of named entities and the blacklist keyword. Based on the classification, a rule may be identified that specifies which named entity in the pair is to be flagged. Further, a node in the graph may be flagged based on an association with the named entity identified according to the rule.

According to examples disclosed herein, the node in the graph may be flagged based on the association with the named entity identified according to the rule by determining, based on the rule, whether a first named entity or a second named entity of the pair of named entities is to be flagged. Based on a determination that the first named entity of the pair of named entities is to be flagged, the first named entity may be flagged. Further, based on a determination that the second named entity of the pair of named entities is to be flagged, the second named entity may be flagged.

According to examples disclosed herein, a runtime subsystem 151 that is executed by the at least one hardware processor (e.g., the hardware processor 1102) may ascertain the target entity. The runtime subsystem 151 may determine a subgraph associated with the target entity from the graph. The subgraph may include a bidirectional, rootless portion of the graph comprising the target entity and n-levels of entities linked to the target entity. The runtime subsystem 151 may convert the subgraph to a point-of-view (POV) tree with the target entity as a root node. The runtime subsystem 151 may calculate a score for the target entity. Further, the runtime subsystem 151 may generate a visualization of the subgraph and the score.

According to examples disclosed herein, the runtime subsystem 151 may convert the subgraph to the POV tree with the target entity as the root node by determining predecessor nodes of the target node in the subgraph, and traversing the determined predecessor nodes of the target node. For each determined predecessor node, the runtime subsystem 151 determine successor nodes and further predecessor nodes. The runtime subsystem 151 may traverse the determined successor nodes and the further predecessor nodes. Further, the runtime subsystem 151 may determine a list of edges between the target node, the determined predecessor nodes of the target node, the determined successor nodes, and the determined further predecessor nodes.

According to examples disclosed herein, the runtime subsystem 151 may calculate the score for the target entity by determining, for each level of the POV tree that includes a flagged node, a maximum weight associated with the level that includes the flagged node. The runtime subsystem 151 may divide, for each level of the POV tree that includes the flagged node, the determined maximum weight by a level number to determine a risk score at each level of the POV tree that includes the flagged node. Further, the runtime subsystem 151 may add each determined risk score to determine the score for the target entity.

According to examples disclosed herein, a risk controller 114 that is executed by the at least one hardware processor (e.g., the hardware processor 1102) may determine, based on the score for the target entity, a risk category associated with the target entity. Further, the risk controller 114 may control an operation associated with the target entity based on the risk category associated with the target entity.

According to examples disclosed herein, the risk controller 114 may control the operation associated with the target entity based on the risk category associated with the target entity by disabling, based on the risk category associated with the target entity, access to an account related to the target entity.

Referring to FIGS. 1-10 and 12, and particularly FIG. 12, for the method 1200, at block 1202, the method may include ascertaining, by at least one hardware processor, a target entity.

At block 1204, the method may include determining, by the at least one hardware processor, a subgraph associated with the target entity from a bi-direction rootless graph of linked named entities identified in text from a corpus of documents. The subgraph may include a bidirectional, rootless portion of the graph comprising the target entity and n-levels of entities linked to the target entity.

At block 1206, the method may include converting, by the at least one hardware processor, the subgraph to a point-of-view (POV) tree with the target entity as a root node.

At block 1208, the method may include calculating, by the at least one hardware processor, a score for the target entity.

At block 1210, the method may include determining, by the at least one hardware processor and based on the score for the target entity, a risk category associated with the target entity.

At block 1212, the method may include controlling, by the at least one hardware processor, an operation associated with the target entity based on the risk category associated with the target entity.

Referring to FIGS. 1-10 and 13, and particularly FIG. 13, for the block diagram 1300, the non-transitory computer readable medium 1302 may include instructions 1306 to identify named entities in text from a corpus of documents.

The processor 1304 may fetch, decode, and execute the instructions 1308 to classify the named entities into a category of a plurality of categories that include a person and an organization.

The processor 1304 may fetch, decode, and execute the instructions 1310 to resolve references in the text with the identified named entities.

The processor 1304 may fetch, decode, and execute the instructions 1312 to determine links between the named entities.

The processor 1304 may fetch, decode, and execute the instructions 1314 to generate a bi-direction rootless graph of the linked named entities.

The processor 1304 may fetch, decode, and execute the instructions 1316 to determine semantic relationships from text of the named entities.

The processor 1304 may fetch, decode, and execute the instructions 1318 to identify blacklist keywords associated with the semantic relationships.

The processor 1304 may fetch, decode, and execute the instructions 1320 to perform machine learning classification based on a pair of the named entities and a blacklist keyword determined to be semantically associated with the pair of named entities.

The processor 1304 may fetch, decode, and execute the instructions 1322 to determine a classification based on the pair of named entities and the determined blacklist keyword.

The processor 1304 may fetch, decode, and execute the instructions 1324 to identify, based on the classification, a rule that specifies which named entity in the pair is to be flagged.

The processor 1304 may fetch, decode, and execute the instructions 1326 to flag a node in the graph based on an association with the named entity identified according to the rule.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A natural language processing (NLP) and artificial intelligence based search system comprising:
   at least one hardware processor;
   a named entity recognizer, executed by the at least one hardware processor, to identify named entities in text from a corpus of documents;
   a coreference resolver, executed by the at least one hardware processor, to resolve references in the text with the identified named entities;
   a relationship extractor, executed by the at least one hardware processor, to
      determine links between the named entities, and
      generate a bi-direction rootless graph of the linked named entities;
   a semantic extractor, executed by the at least one hardware processor, to
      determine semantic relationships from text of the named entities, and
      identify blacklist keywords associated with the semantic relationships;
   an entity classifier, executed by the at least one hardware processor, to
      perform machine learning classification based on a pair of the named entities and a blacklist keyword determined to be semantically associated with the pair of named entities according to the semantic extractor, wherein
         the entity classifier determines a classification based on the pair of named entities and the blacklist keyword,
         based on the classification, a rule is identified that specifies which named entity in the pair is to be flagged in accordance with the blacklist keyword that includes negative information with respect to an entity, and
         a node in the graph is flagged based on an association with the named entity identified according to the rule; and
   a runtime subsystem, executed by the at least one hardware processor, to:
      ascertain a target entity,
      determine a subgraph associated with the target entity from the graph, wherein the subgraph includes a bidirectional, rootless portion of the graph comprising the target entity and n-levels of entities linked to the target entity,
      convert the subgraph to a point-of-view (POV) tree with the target entity as a root node,
      calculate a score for the target entity by:
         determining, for each level of the POV tree that includes a flagged node, a maximum weight associated with the level that includes the flagged node;
         dividing, for each level of the POV tree that includes the flagged node, the determined maximum weight by a level number to determine a risk score at each level of the POV tree that includes the flagged node; and
         adding each determined risk score to determine the score for the target entity; and
      generate a visualization of the subgraph and the score.

2. The system of claim 1, further comprising:
   a risk controller, executed by the at least one hardware processor, to:
      determine, based on the score for the target entity, a risk category associated with the target entity; and
      control an operation associated with the target entity based on the risk category associated with the target entity.

3. The system of claim 2, wherein the risk controller is executed by the at least one hardware processor to control the operation associated with the target entity based on the risk category associated with the target entity by:
   disabling, based on the risk category associated with the target entity, access to an account related to the target entity.

4. The system of claim 1, wherein the named entity recognizer is executed by the at least one hardware processor to identify named entities in text from the corpus of documents by:
   identifying the named entities from the text in the documents; and
   classifying the named entities into a category of a plurality of categories that include a person and an organization.

5. The system of claim 1, wherein the relationship extractor is executed by the at least one hardware processor to determine links between the named entities by:
 identifying relationships between the named entities from a plurality of relationships that include person-to-person, person-to-organization, organization-to-person, and organization-to-organization; and
 determining, based on the identified relationships between the named entities, the links between the named entities.

6. The system of claim 1, wherein the semantic extractor is executed by the at least one hardware processor to identify the blacklist keywords associated with the semantic relationships by:
 identifying the blacklist keywords that include verbs associated with the semantic relationships.

7. The system of claim 1, wherein the entity classifier determines a classification based on the pair of named entities and the blacklist keyword by:
 determining, based on the blacklist keyword, a classification category associated with the blacklist keyword from a plurality of classification categories; and
 assigning the determined classification category to the pair of named entities.

8. The system of claim 1, wherein the node in the graph is flagged based on the association with the named entity identified according to the rule by:
 determining, based on the rule, whether a first named entity or a second named entity of the pair of named entities is to be flagged;
 based on a determination that the first named entity of the pair of named entities is to be flagged, flagging the first named entity; and
 based on a determination that the second named entity of the pair of named entities is to be flagged, flagging the second named entity.

9. The system of claim 1, wherein the runtime subsystem is executed by the at least one hardware processor to convert the subgraph to the POV tree with the target entity as the root node by:
 determining predecessor nodes of the target node in the subgraph; and
 traversing the determined predecessor nodes of the target node.

10. The system of claim 9, wherein the runtime subsystem is executed by the at least one hardware processor to convert the subgraph to the POV tree with the target entity as the root node by:
 for each determined predecessor node, determining successor nodes and further predecessor nodes; and
 traversing the determined successor nodes and the further predecessor nodes.

11. The system of claim 10, wherein the runtime subsystem is executed by the at least one hardware processor to convert the subgraph to the POV tree with the target entity as the root node by:
 determining a list of edges between the target node, the determined predecessor nodes of the target node, the determined successor nodes, and the determined further predecessor nodes.

12. A computer implemented method for implementing a natural language processing (NLP) and artificial intelligence based search comprising:
 ascertaining, by at least one hardware processor, a target entity;
 determining, by the at least one hardware processor, a subgraph associated with the target entity from a bi-direction rootless graph of linked named entities identified in text from a corpus of documents, wherein the subgraph includes a bidirectional, rootless portion of the graph comprising the target entity and n-levels of entities linked to the target entity;
 converting, by the at least one hardware processor, the subgraph to a point-of-view (POV) tree with the target entity as a root node;
 calculating, by the at least one hardware processor, a score for the target entity by
  determining, by the at least one hardware processor, for each level of the POV tree that includes a flagged node, a maximum weight associated with the level that includes the flagged node;
  dividing, by the at least one hardware processor, for each level of the POV tree that includes the flagged node, the determined maximum weight by a level number to determine a risk score at each level of the POV tree that includes the flagged node; and
  adding, by the at least one hardware processor, each determined risk score to determine the score for the target entity;
 determining, by the at least one hardware processor and based on the score for the target entity, a risk category associated with the target entity; and
 controlling, by the at least one hardware processor, an operation associated with the target entity based on the risk category associated with the target entity.

13. The method according to claim 12, wherein converting the subgraph to the POV tree with the target entity as the root node further comprises:
 determining, by the at least one hardware processor, predecessor nodes of the target node in the subgraph;
 traversing, by the at least one hardware processor, the determined predecessor nodes of the target node;
 for each determined predecessor node, determining, by the at least one hardware processor, successor nodes and further predecessor nodes;
 traversing, by the at least one hardware processor, the determined successor nodes and the further predecessor nodes; and
 determining, by the at least one hardware processor, a list of edges between the target node, the determined predecessor nodes of the target node, the determined successor nodes, and the determined further predecessor nodes.

14. A non-transitory computer readable medium having stored thereon machine readable instructions, the machine readable instructions, when executed by at least one hardware processor, cause the at least one hardware processor to:
 identify named entities in text from a corpus of documents;
 classify the named entities into a category of a plurality of categories that include a person and an organization;
 resolve references in the text with the identified named entities;
 determine links between the named entities;
 generate a bi-direction rootless graph of the linked named entities;
 determine semantic relationships from text of the named entities;
 identify blacklist keywords associated with the semantic relationships;
 perform machine learning classification based on a pair of the named entities and a blacklist keyword determined to be semantically associated with the pair of named entities;

determine a classification based on the pair of named entities and the determined blacklist keyword;
identify, based on the classification, a rule that specifies which named entity in the pair is to be flagged in accordance with the blacklist keyword;
flag a node in the graph based on an association with the named entity identified according to the rule;
ascertain a target entity;
determine a subgraph associated with the target entity from the graph, wherein the subgraph includes a bidirectional, rootless portion of the graph comprising the target entity and n-levels of entities linked to the target entity;
convert the subgraph to a point-of-view (POV) tree with the target entity as a root node;
calculate a score for the target entity by:
  determining, for each level of the POV tree that includes a flagged node, a maximum weight associated with the level that includes the flagged node;
  dividing, for each level of the POV tree that includes the flagged node, the determined maximum weight by a level number to determine a risk score at each level of the POV tree that includes the flagged node; and
  adding each determined risk score to determine the score for the target entity; and
generate a visualization of the subgraph and the score.

15. The non-transitory computer readable medium according to claim 14, wherein the machine readable instructions to determine links between the named entities, when executed by the at least one hardware processor, further cause the at least one hardware processor to:
  identify relationships between the named entities from a plurality of relationships that include person-to-person, person-to-organization, organization-to-person, and organization-to-organization; and
  determine, based on the identified relationships between the named entities, the links between the named entities.

16. The non-transitory computer readable medium according to claim 14, wherein the machine readable instructions to identify the blacklist keywords associated with the semantic relationships, when executed by the at least one hardware processor, further cause the at least one hardware processor to:
  identify the blacklist keywords that include verbs associated with the semantic relationships.

17. The non-transitory computer readable medium according to claim 14, wherein the machine readable instructions to determine the classification based on the pair of named entities and the determined blacklist keyword, when executed by the at least one hardware processor, further cause the at least one hardware processor to:
  determine, based on the blacklist keyword, a classification category associated with the blacklist keyword from a plurality of classification categories; and
  assign the determined classification category to the pair of named entities.

* * * * *